United States Patent [19]
Bartow et al.

[11] Patent Number: 5,267,240
[45] Date of Patent: Nov. 30, 1993

[54] FRAME-GROUP TRANSMISSION AND RECEPTION FOR PARALLEL/SERIAL BUSES

[75] Inventors: Neil G. Bartow, Saugerties; Paul J. Brown, Poughkeepsie; Robert S. Capowski, Verbank; Louis T. Fasano, Poughkeepsie; Thomas A. Gregg, Highland; Gregory Salyer, Woodstock; Patrick J. Sugrue, Hyde Park; Douglas W. Westcott, Rhinebeck; Vincent P. Zeyak, Jr., Poughkeepsie, all of N.Y.

[73] Assignee: International Business Machines Corporation, Armonk, N.Y.

[21] Appl. No.: 839,986

[22] Filed: Feb. 20, 1992

[51] Int. Cl.⁵ .............................................. G06K 5/04
[52] U.S. Cl. .............................................. 371/1; 370/32
[58] Field of Search .............. 371/1; 376/32, 91; 395/200, 250, 575

[56] References Cited

U.S. PATENT DOCUMENTS

| | | | |
|---|---|---|---|
| 3,253,259 | 5/1966 | Jacoby | 340/147 |
| 4,850,047 | 7/1989 | Iguchi et al. | 455/612 |
| 4,864,565 | 9/1989 | Schuster et al. | 370/105.1 |
| 4,970,714 | 11/1990 | Chen et al. | 370/17 |
| 4,974,223 | 11/1990 | Ancheta et al. | 370/94.1 |
| 5,005,191 | 4/1991 | O'Connor et al. | 375/116 |
| 5,121,003 | 6/1992 | Williams | 307/452 |
| 5,157,530 | 10/1992 | Loeb et al. | 371/1 |

OTHER PUBLICATIONS

IBM Technical Disclosure Bulletin, vol. 5, No. 7, Dec. 1962, pp. 68-69, "Deskewing Using Last . . . Byte" by E. W. Miller.
IBM Technical Disclosure Bulletin, vol. 6, No. 8, Jan. 1964, pp. 100-101, "A System For Deskewing Tape Signals" by A. Scherr et al.

*Primary Examiner*—Vincent P. Canney
*Attorney, Agent, or Firm*—Lynn L. Augspurger

[57] ABSTRACT

A system and method for asynchronously transmitting data blocks, in parallel, across multiple fibers in a serial manner. Frame groups are provided as a mechanism to transmit associated data serially on each fiber and tie the data being transmitted together. The frame groups do not have sequence numbers, therefore, the receiver determines which frames are part of a frame group by the arrival times of the individual frames. In one embodiment, the transceivers for each member of the parallel bus asynchronously achieve synchronism at each end of the fiber. Thus the need for a common clock is eliminated. The receivers on each side of the bus determine the relative skew for each conductor by performing skew measurements on a calibration message generated by the transmitters on the other side of the bus. When the skew on all conductors, viewed from both sides of the bus, has been determined, the skew values are exchanged across the bus, thus enabling the transmitters to set proper frame spacing.

23 Claims, 6 Drawing Sheets

FRAME-GROUP TRANSMISSION AND RECEPTION FOR PARALLEL/SERIAL BUSES

I. BACKGROUND OF THE INVENTION

A. Field of the Invention

The present invention relates to data communications systems. More particularly, the present invention relates to data communication systems using optical fibers to carry information.

B. Related Art

Fiber optics enable the transmission of long string of data in a serial fashion from a driver to a receiver at long distances (kilometers) at very high data rates (billions of bits per second). This is in contrast to traditional electrical wires which allow data to be transmitted for only short distances at these data rates (10's of meters).

High performance computers require system buses between elements of a computing system to have even higher bandwidths (100's of millions of bytes per second). The use of a single fiber optic cable running at its maximum bandwidth can be insufficient to serve as a system bus between elements of a computing system.

In the prior art, a classical solution to the problem of inadequate bandwidth on a single carrier is to transmit the bits of each data word, in parallel, one over each of a plurality of carriers (a parallel bus). Another solution, known as striping, entails sending a plurality of serial data words, in parallel, one over each of a plurality of carriers. These solutions, however, share a common problem in that skew can develop between the parallel bits or words as they are sent over the bus.

Skew is a propagation time variation between the fastest and the slowest carrier. If not handled properly, such propagation time variations can cause data errors at the receiver. Skew can be caused by differences in the physical characteristics of the driver, receiver and transmission medium for each carrier of the bus.

There are two general categories of skew. One is random skew (RSKEW) and appears as jitter. Sources of this skew are due to clock synchronization and null word insertion. The other type of skew is systemic (SSKEW) in that one transceiver is always slower or faster than another by a fixed amount of time. Differences in carrier propagation times are a typical source of the systemic type of skew.

The transmitter, carrier, and receiver each introduce skew. Below is a description of how each of these elements introduces skew.

Transmission launch skew is the time difference between the start of frame of the earliest transmitter and the start of frame of the latest transmitter. This type of skew is measured at the transmitters. There are three sources of transmission launch skew. The first is random and is caused by the synchronization of the transmitter clock to the system clock. Where the all transmitter clocks are locked to a common reference clock, and there is a common system clock synchronization point, the launch skew can be as small as one bit time, or even less. The second source of transmission launch skew is also random and is caused by null insertion. The third source of transmission launch skew is systemic and is due to differences in internal signal propagation times from transceiver to transceiver. Any reasonable physical design should limit this skew to several bit times.

A significant amount of skew is caused by the characteristic of the carrier itself. The carrier skew is simply the difference in propagation times between the slowest and fastest carriers in a link. This skew is almost entirely systemic. Slight variations can occur over time due to environmental changes such as temperature. Thus, it should be understood that even if a plurality of frames are launched at the same time, they are likely to arrive at different times because of the carrier skew.

Skew can also be caused by the characteristics of the receiver. There are two sources of skew in the receiver. The first is random and is caused by the synchronization of the system clock to the receiver clock. The second source of receiver skew is systemic and is due to differences in internal signal propagation times between different transceivers. As with the transmitter, any reasonable physical design should limit this skew to several bit times.

To avoid data errors of the type which can be caused by skew, some means for synchronization of the parallel bits is conventionally employed. Traditional parallel bus designs use a common clock to achieve synchronization. This solution, while workable, is inefficient in that the common clock typically causes the data collection to be performed in lock step, at a speed limited at the upper end by the slowest bit path transmission time.

Thus what is needed is an improved method for transmitting data words over a plurality of carriers such as multiple fiber optic filaments.

II. SUMMARY OF THE INVENTION

The present invention comprises a system and method for asynchronously transmitting data blocks, in parallel, across multiple carriers in a serial manner. Frame groups are provided as a mechanism to transmit associated data serially on each fiber and tie the data being transmitted together. The receiver is provided with a previously measured maximum skew value for a given link. Using this information, the receiver determines which frames are part of a frame group by the arrival times of the individual frames.

According to an embodiment of the present invention, the transceivers for each member of the parallel bus asynchronously achieve synchronism at each end of the fiber. Thus the need for a common clock is eliminated. The receivers on each side of the bus determine the relative skew for each conductor by performing skew measurements on a series of calibration frames generated by the transmitters on the other side of the bus. When the skew on all conductors, viewed from both sides of the bus, has been determined, the skew values are exchanged across the bus, thus enabling the transmitters to set proper frame spacing.

Advantageously, skew measurement according to the present invention enables data to be sent across a link comprising a multi-carrier bus, limited only by the maximum bandwidth of the link itself rather than by the worst case theoretical skew. According to an embodiment of the present invention, data integrity is ensured by first measuring the relative skew values for the carriers in a link, at the time that the link is established or reinitialized. After the relative skew values have been determined, they are exchanged between both sides of the link and a connection is established having the start-to-start spacing of transmitted frames limited to the worst case (largest) skew value measured by the receivers. Since frames can be made very large, a significant amount of data can be sent across the link, at the maximum link bandwidth without concern for skew. Further, where large data frames are used, the bandwidth limiting effect of limiting the start-to-start frame spacing to the worst case skew value for a given link can be kept at a minimum.

III. BRIEF DESCRIPTION OF THE DRAWING

The present invention will be better understood by reference to the drawing in which.

Like reference numerals appearing in more than one FIGURE designate like elements

IV. DETAILED DESCRIPTION OF THE PREFERRED EMBODIMENTS

Figure 1:
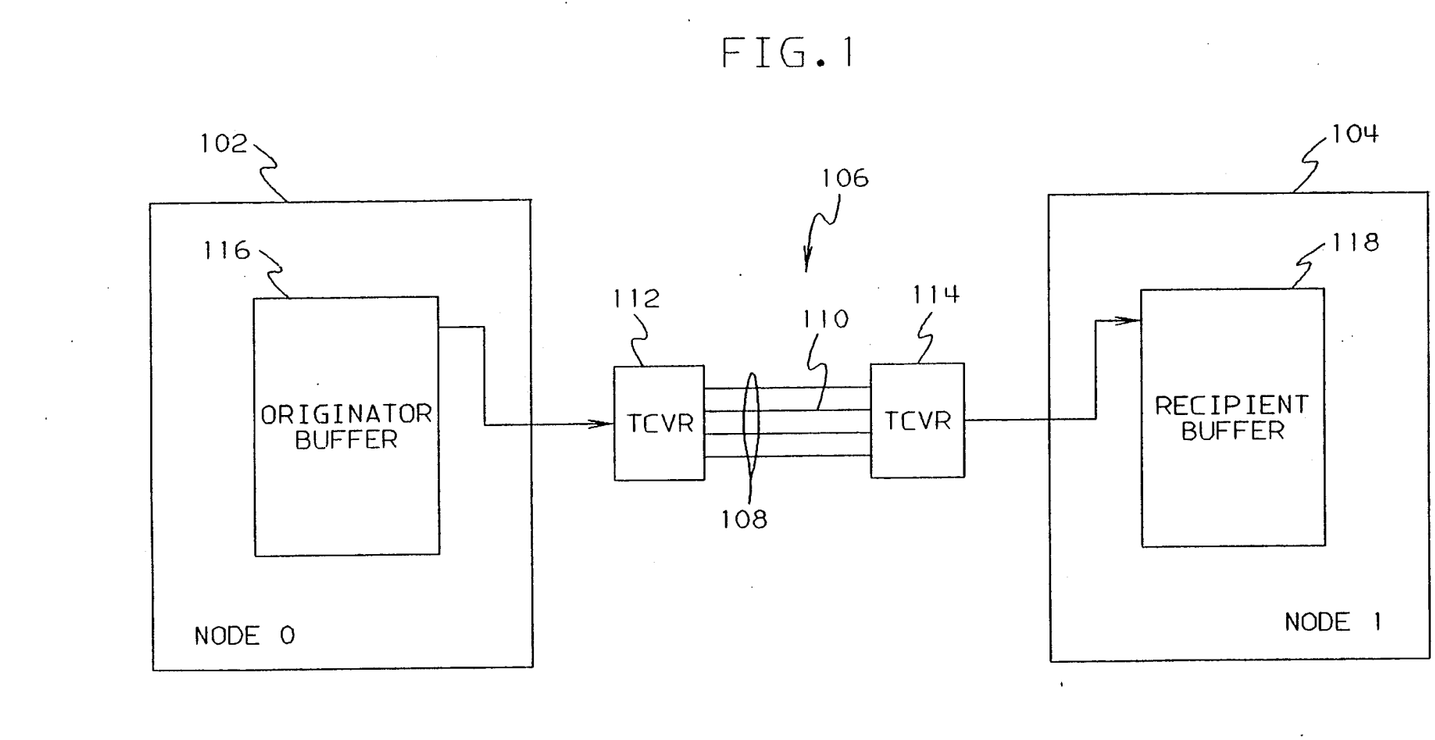
FIG. 1 is a block diagram of a physical link between two computing elements.

Turning first to FIG. 1, a physical link between two computing elements 102, 104 is illustrated. These elements could be, for example, two computers or a computer and a shared memory device. In any event, the computing elements 102, 104 are connected by way of an intersystem channel link 106 comprising a fiber optic bus 108. The fiber optic bus 108 is formed of multiple fiber pairs 110. Each fiber pair consists of two optical fibers, one for transmitting information and one for receiving information. While any number of fiber pairs can be used, exemplary values for intersystem channels would be a range of 1 to 64 fiber pairs in powers of two. The fiber pairs 110 of the fiber optic bus 108 are coupled to the computing elements 102, 104 by way of transceivers 112, 114 located at opposite ends bus. Each of the transceivers 112, 114 includes a transmitter unit and a receiver unit, both of which will be described in more detail later.

Data is sent across the link from an originator buffer 116 in a transmitting computing element. The received data is then collected and temporarily stored in a recipient buffer 118 in a receiving computing element. Although one buffer is shown in each of the computing elements of FIG. 1, it should be understood that a computing element can dynamically set up various numbers of originator and/or recipient buffers depending on the number and type of links to be established. The buffers 116, 118 can be of the "store-thru" type, meaning that they need not be filled before they are unloaded. This type of buffering has the advantage of lower transmission and reception latency times.

The information to be sent is divided up among the fiber pairs 110 that form the fiber optic bus 108. The information is sent from the originator buffer 116 to the recipient buffer 118 in the form of frames. Each frame is transferred on a single fiber of the bus 108. More information on configuration of the link and the structure of the buffers are contained, respectively, in copending applications entitled CONFIGURABLE, RECOVERABLE PARALLEL BUS to Bartow et al. (Ser. No. 07/839,657) and HIGH PERFORMANCE CHANNELS FOR DATA PROCESSING SYSTEMS to Bartow et al. (Ser. No. 07/839,652), both assigned to the same assignee as the present application and filed on even date herewith and both of which are incorporated by reference herein in their entireties.

Figure 2:
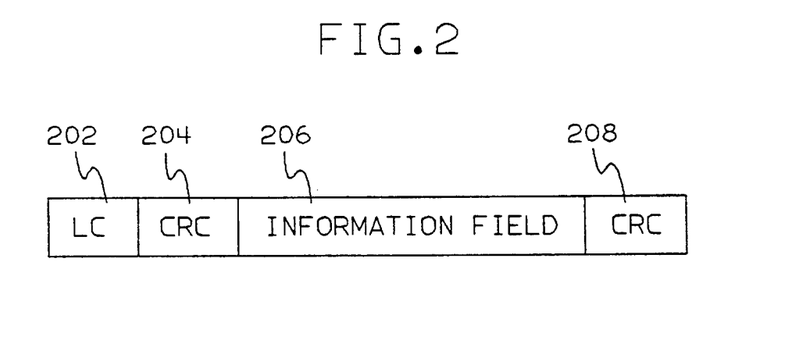
FIG. 2 is an illustration of the format of an exemplary frame.

The format of an exemplary frame is illustrated in FIG. 2. Each frame starts with a link-control word (LC) 202. Various fields in the link-control word 202 identify the frame format and type, designate a buffer area, and control the state of the transceiver and link.

A link-control-CRC (cyclical redundancy check) word 204 follows the link-control word. The link-control CRC word 204 is conventionally generated from the values in the link-control word. The link-control CRC word is checked at the receiver to test the validity of the link-control word in the incoming frame.

There are two types of frames, control frames and information frames. Control frames do not require an information field. They consist only of a link-control word and a link-control CRC word. An information frame has a link-control word 202 a link-control CRC word 204 and an information field 206. Information fields contain, for example, from one to 1,024 words. The information field is used to send information from a buffer area at one end of the link to a buffer area at the other end.

An information field is followed by an information-field CRC word 208. The information-field CRC word is conventionally generated from the values in the information field. The information field CRC word is checked at the receiver to test the validity of the information field in the incoming frame.

Figure 3:
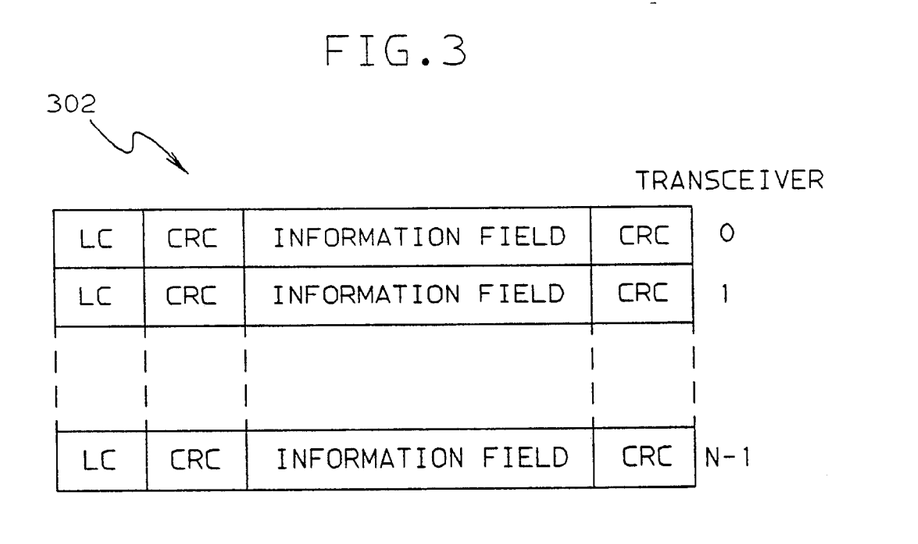
FIG. 3 is an illustration of the format of an exemplary frame group.

Related information can be placed in several frames, one on each transceiver of the operational link. These frames (referred to as a "frame group") are transmitted concurrently. There are can be as many frames in the group as there are transceivers in the operational link. FIG. 3 shows an exemplary frame group 302. The use of the frame group enables the data to be sent at a bandwidth that is multiples of the single fiber optic bandwidth since multiple frames (one per fiber) are transmitted simultaneously across the link.

Although not provided with sequence numbers, the link control words in each frame group are interlocked with those of subsequent and previous frame groups. The interlocking can be accomplished in a number of different ways. For example, each transmission may start with a request, followed by data, followed by an acknowledge. Each of these types of transmissions having a unique link control word. Further, a sending and-/or recipient buffer address can be sent within the link control words. Thus data transmissions from (and/or directed to) different buffers will have different link control words.

In the preferred embodiment, frames associated with the same buffer and the same type of frame group may have the same link control words. For example a given message may include 16 data frames, 15 of which will have the same LC and one of which will have a distinct LC in that it includes a bit indicating the start of a buffer area. In this case, a lost frame among the 15 having an identical LC can not necessarily be detected by comparing the LCs in each received frame group. Instead, either the comparison of LCs in the last frame group will detect the problem because a frame belonging to the next frame group (of a different type and having a different LC) has been received, or the skew timer will expire (as described later). In either event, the receiver will detect that all data has not been received for the buffer area. This is accomplished by comparing the total number bytes actually received with the total transmitted byte count which is included as part of every LC.

As an alternative embodiment, the transmitter can ensure that the link control words in each frame group are identical with each other, but are different than those in the immediately previous and subsequent frame groups.

Information from a originator buffer is sent across the link in one or more frame groups. When several frame groups are used to transmit the contents of one buffer, the frame groups may be sent in a sequence corresponding to the ascending order of the words in the buffer. For example, groups of lower numbered words are sent before groups of higher numbered words. When the operational link comprises more than one transceiver, the buffer contents are sent in units of words on a transceiver basis. That is to say, the words are distributed across the transceivers (and thus the fibers), modulo the number of transceivers in the link (e.g. transceiver 0 has word 0, 4, 8, 12 in a four transceiver operational link).

According to an embodiment of the present invention, the transceivers for each carrier of the bus asynchronously achieve synchronism at each end of the fiber. Thus the need for a common clock is eliminated. Various means for synchronizing frames transmitted as serial data over a signal conductor are known in the art and thus will not be discussed in detail here. An example of such synchronization means is described in U.S. Pat. No. 4,970,714 to Chen et al. and assigned to the same assignee as the present invention.

Each fiber and its associated transmission and reception hardware has differing propagation characteristics which result in skew. Skew is the propagation time variation between the fastest and the slowest fiber. Reception of a start of a frame on any fiber causes the receiver to start checking for reception of the complete frame group and to reassemble the received frames of data in the recipient buffer. The receiver determines which frames are part of a frame group by the arrival times of the individual frames and the contents of the link control words. If all of the frames of a frame group are not received within an established skew window or if the link control words received within the skew window are not identical, a skew error is recognized.

The skew rules, according to an embodiment of the present invention, set the skew window in which all frames of a frame-group must be received in order to receive a valid message. The rules also set the rate at which consecutive frame groups can be transmitted so that frames of one frame-group are not confused with frames of another frame-group. Further, examination of link control words for consistency within a given frame group protects the system from "lost frame" effects.

For a given link, the skew of frame groups measured at the receiver varies by plus or minus the random skew (RSKEW) component. The maximum RSKEW component is set by the design of the link hardware while the systemic skew (SSKEW) component is largely due to the optical cable installation. According to an embodiment of the present invention, a measurement of the total skew (the optical and random components) is made at the time the link is initialized to ensure that the it does not exceed set limits and further to ensure that frames belonging to a common frame group are properly identified as such by the receiver.

Figure 4:
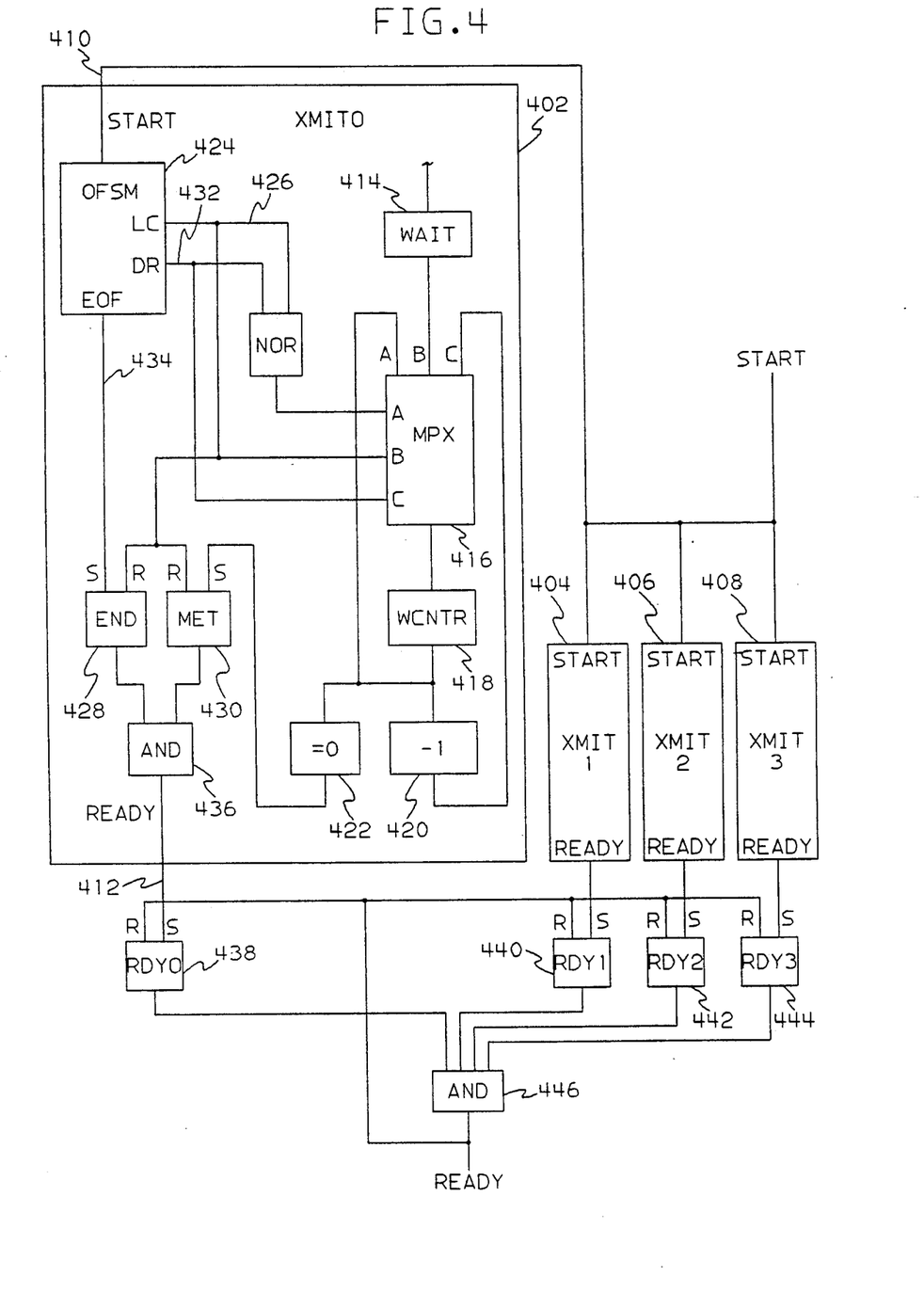
FIG. 4 is a logic diagram of an exemplary transmitter.

An exemplary transmitter unit according to an embodiment of the present invention is illustrated in FIG. 4. A four transceiver link is shown. The individual transmitters (one for each fiber optic carrier) are shown as XMIT0 402, XMIT1 404, XMIT2 406, and XMIT3 408. It should be understood that the transmitter of FIG. 4 can be operated using fewer than four carriers (e.g. 3, 2 or 1) by gating out selected transmit portions.

The internals of XMIT0 402 are shown. Along with the data paths (not shown), each transmitter has an input named START 410 which starts frame generation. Each transmitter also has an output called READY 412 which indicates that the current frame transmission has ended, and that the skew wait time has elapsed.

Within each transmitter there is a WAIT register 414 which is initialized at link initialization time. The value in the WAIT register 414 is the number of words which must be transmitted between LC (Link Control) words. The Wait register 414 is connected to a 3 input multiplexor (MPX) 416. The output of the MPX 416 is connected to a wait counter register (WCNTR) 418. The output of the WCNTR 418 is connected to decrementer (−1) 420, an 8 input nand circuit (=0) 422 detecting a value of zero in the WCNTR 418, and back to a first one (A) of the MPX 416 inputs (A-C). The output of decrementer 420 is connected to the third data input (C) of the MPX 416.

The channel starts a frame when all four transmitters are ready (i.e. all transmitters are idle and the minimum LC word to LC word spacing time has elapsed) by turning on the START line 410 for 1 cycle. This line causes each transmitter to begin frame transmission. When the Outbound Frame State Machine (OFSM) 424 sends the LC (indicated on line 426), the END 428 and MET 430 Shift Register Latches (SRLs) are reset, and the value in the WAIT register 414 is gated through the MPX 416 and the WCNTR 418. As words are sent on the link, the Data Request line (DR) 432 is active, and the WCNTR 418 is decremented via the decrementer 420 and MPX 416 circuits. The End Of Frame (EOF) may become active before, during, or after the WCNTR 418 reaches the value of zero. The EOF line 434 sets the END SRL 428, and the 8 input nand circuit 422 sets the MET SRL 430. When both SRLs 428, 430 are on, the output of the AND circuit 436 is active, and all conditions have been satisfied for the start of the next frame for that transceiver.

The READY lines 412 from the transmitters set the RDY0 438, RDY1 440, RDY2 442, and RDY3 444 SRLs. The outputs of these SRLs are connected to a 4 input AND circuit 446. When all 4 RDY SRLs are set, the output of the AND circuit 446 indicates that all 4 transmitters are ready to start the next frame. The output of this AND circuit 446 is also used to reset the RDY SRLs 438-444.

Figure 5:
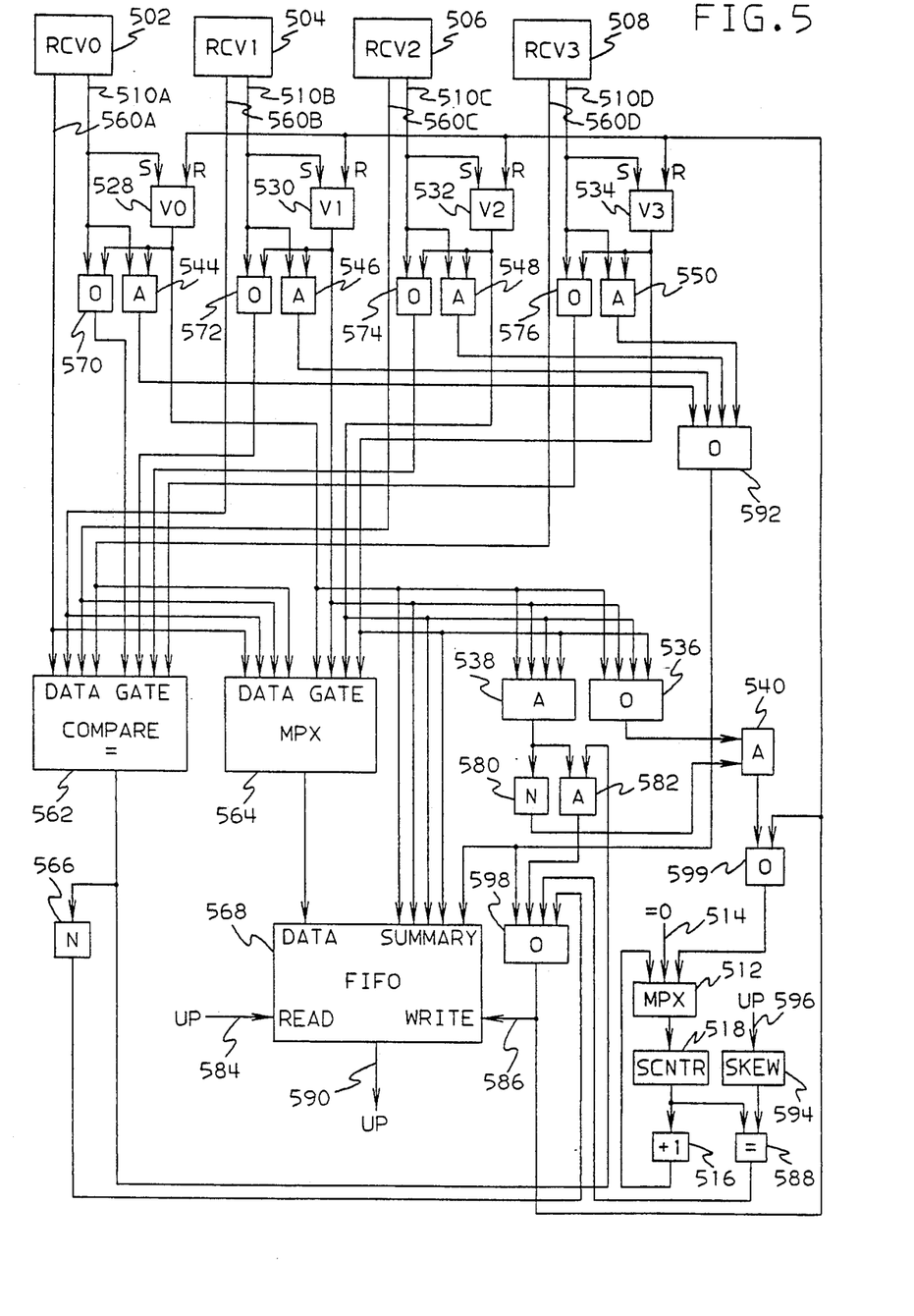
FIG. 5 is a logic diagram of an exemplary receiver.

An exemplary receiver unit according to an embodiment of the present invention is illustrated in FIG. 5. A four transceiver link is shown. The receivers are shown as RCV0 502, RCV1 504, RCV2 506, and RCV3 508. The data paths 560 (A-D) from each receiver contain the current LC detected by the receiver. The output lines 510 (A-D) are active for 1 cycle each time a new LC is detected by the corresponding receiver. The contents of the data paths 560 (A-D) are compared by the gated compare logic (COMPARE) 562, and are also selected by the gated multiplexor (MPX) 564.

The Set-Reset latches (S-R latches) V0 528, V1 530, V2 532, and V3 534 are set by the respective lines 510 (A-D) from the receivers. When a receiver detects a new LC, the corresponding S-R latch 528-534 is set. The four S-R latches 528-534 control the MPX 564, and are inputs to the first-in first-out buffer (FIFO) 568, a four input AND gate (A) 538, and a four input OR gate (0) 536. The four OR gates 570-576 each have two inputs. One input is a line 510 (A-D) from a corresponding one of the receivers, and the other input is the output of a corresponding one of the S-R latches 528-534. The output of these OR gates 570-576 signal to the COMPARE 562 and determines which of the data paths to compare.

The skew measurement function is performed by a counter (SCNTR) 518 which is fed from a second multiplexor (MPX) 512. The second multiplexor 512 gates either a zero value 514 or the incremented value (+1) 516 to the skew counter (SCNTR) 518. The SCNTR 518 is an eight bit register. The output of the SCNTR 518 feeds an equal-to compare circuit (=) 588 and the incrementer (+1) 516. The other input to compare 588 is from the output of a register (SKEW) 594. When the value in SCNTR 518 is equal to the value in SKEW 594, the output of the compare circuit 588 is active. The value in SKEW 594 is set by a microprocessor (not shown) over line 596.

The FIFO 568 stores an LC selected from one of the receivers along with summary information describing which of the receivers detected the LC. The write line 586 to the FIFO 568 is controlled by a four input or (0) circuit 598. The microprocessor reads entries in the FIFO 568 over a data bus 590 by activating the read line 584.

As with the transmitter unit, receivers for any of the carriers can be gated out of the system under control of the microprocessor via a control register (not shown).

Operation of an exemplary receiver unit according to an embodiment of the present invention as illustrated in FIG. 5 starts with the receipt of an LC by at least one of the receivers and finishes with a write operation to the FIFO 568. When the first LC is received by one or more of the receivers RCV0 502, RCV1 504, RCV2 506, and RCV3 508, the corresponding S-R latch 528-534 is set. The output of OR circuit 536 is activated which starts the increment of the SCNTR 518. When all four LC's are received, all four S-R latches 528-534 are set and the output of AND gate 538 is active (HIGH). This output feeds an inverter 580 which, in turn, feeds an AND gate 540. Thus, when AND gate 538 is active (HIGH) the output of AND gate 540 is deactivated (LOW) which, in turn, stops the SCNTR 518 through AND gate 540 and OR gate 599. If all LC's have been received and they all compare equal (as detected by COMPARE 562) the output of AND gate 582 is active. This output feeds OR gate 598 which, in turn, causes a write into the FIFO 568. Along with the LC from the MPX 564, summary information describing which receivers have an LC is also stored in the FIFO 568.

If an LC is damaged by transmission noise on the link, it is not detected by the receiver. When this happens the output of AND circuit 538 does not activate, and the SCNTR continues to count until its value reaches the value in SKEW 594. At this point, the output of the compare circuit 588 becomes active and it feeds OR circuit 598 which causes an entry to be made into the FIFO 568. In this situation, the summary information in the FIFO 568 indicates which of the receivers did not receive an LC.

Another possible result of a damaged LC is the apparent overlap of two different frame groups. Suppose that two frame groups reach the receivers with the minimum LC to LC spacing, and suppose that the first frame of the first group is damaged and discarded. In this case, the activation of the output of OR gate 536 is delayed until the next LC of the first frame group is received. This delay also starts the SCNTR 518 later. After all of the undamaged LC's have been received, the SCNTR 518 is still running. At this point the first frame of the second frame group may arrive. If the LC of this frame is different that the other LCs at the input of COMPARE 562, the output of COMPARE 562 will activate (since there is a non-compare of the LC's indicating that the LC's are from two different frame groups). An inverter (N) 566 detects the non-compare and feeds OR gate 598 which, in turn, causes a entry into the FIFO 568. The summary information indicates the LC and the receivers which detected this LC. The action of OR gates 570-576 bypasses the delay caused by the S-R latches 528-534 so that the LC which caused the non-compare is not included in the summary information.

OR gate 592 receives inputs from AND gates 544-550. Each of the AND gates 544-550 detects if its respective receiver receives an LC before the previous LC (from the same receiver) has been entered into the FIFO 568. Specifically, the AND gates 544-550 detect when a new LC is received (as indicated by lines 510A-D respectively) before the S-R latches 528-534 have been reset. This situation can occur only if the transmitter feeding the receivers does not obey the skew rules established at initialization time. The output of OR gate 592 feeds OR gate 598 which causes an entry to be made into the FIFO 568. The summary information includes the output of OR gate 592.

In all of the above situations, each time a FIFO 568 entry is made, the S-R latches 528-534 are reset. In the case of the LC non-compare, the S-R latch for the receiver which caused the non-compare is set even though the reset line is active. This is so because the S-R latches' set function overrides the reset function. Also, each time a FIFO 568 entry is made, the SCNTR 518 is reset to zero by the action of OR gate 599 and MPX 512.

It is noted that the transmitters 402-408 of FIG. 4 are not synchronized by a common clock. Similarly, the receivers 502-508 are also not synchronized with one another by a common clock. Instead, each time the link is established the transmitter and receiver pairs achieve synchronization with each other in an asynchronous manner, just as if they connected by the only carrier in the link. Further, the receivers 502-508 use reception of the frames themselves, the skew rules and LC checking as described above to ensure that frames within the same frame group are properly identified as such. Advantageously, this eliminates the need for synchronizing hardware.

Figure 6:
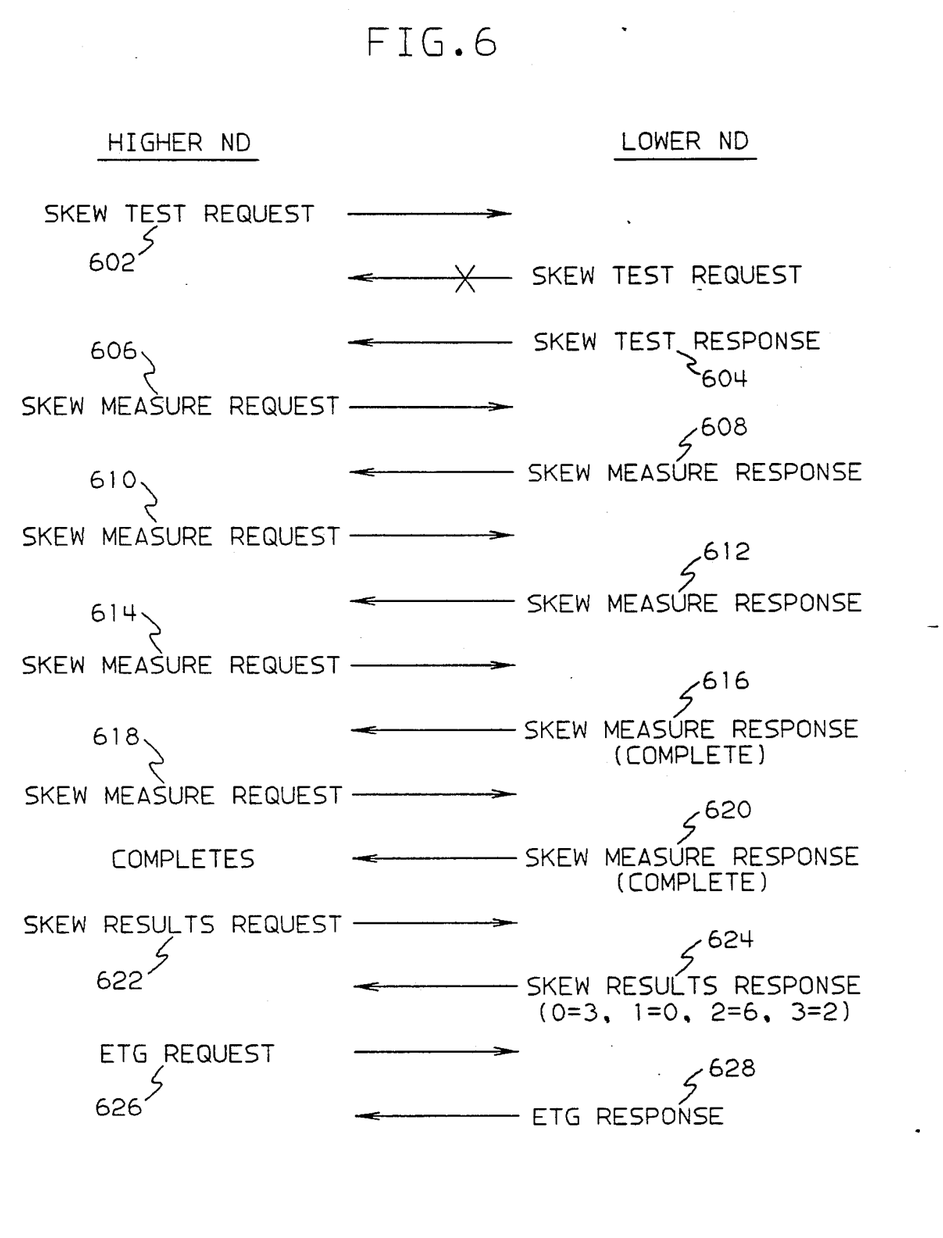
FIG. 6 is a flow diagram of a skew test procedure.

A flow diagram of a skew test/measurement procedure according to an embodiment of the present invention is illustrated in FIG. 6.

When skew measurements are to be performed, any transceiver may send a skew-test-request (STR) control frame 602 (or a replicated STR control frame) out on the link. By replicated, it is meant that an identical copy of a given frame (e.g. the STR frame) is transmitted on each carrier within a 2.5 word time transmit window.

The skew-test-request frame includes a link control word identifying it as an STR. Nodes on both sides of the link may send out a skew test request at the same time. In this case, the node with the higher address becomes the master (i.e. controls the skew measurement procedure) and the node with the lower address becomes the slave. If only one node has sent the STR frame, it becomes the master and the recipient becomes the slave notwithstanding the relative node address.

Once a skew-test-request frame is received by any one of the receivers of the slave receiver unit (and the master slave relationship is established), the slave receiver unit places itself into a skew measurement mode (thereby causing its internal logic to respond as described below), resets its skew counter value to zero, and sets the skew register 594 to a predetermined initial value (e.g. 255). It should be understood, however, that another initial value could alternatively be chosen based on actual experience with a given system. The slave node then sends back a replicated skew-test-response control frame 604. This frame indicates to the master that the slave is ready to begin the skew measurement procedure.

In response to receipt of a skew-test-response frame, the master receiver unit also places itself into skew measurement mode, resets its own skew counter to zero, loads its skew register 594 with an initial value (e.g. 255) and sends out a replicated skew-measure-request (SMR) control frame 606.

When the first slave receiver(s) 502-508 receive the first skew-measure-request frame, the slave receiver unit determines whether all of the frames have arrived within the skew value indicated by the skew register 594. If not, the receiver unit's microprocessor checks the summary information in the FIFO 568 to determine which frame(s) were late (i.e. not received within the skew value indicated by the skew register 594). The receivers detecting the late frames are gated out and are not used in subsequent skew tests. The identity of these receivers and the skew register value is stored in the microprocessors local storage for later use. Next, a new value (e.g. 254) is loaded into the skew register and then the slave sends a replicated skew-measure-response control frame across the link on all carriers (including those whose receivers have been gated out).

The skew-measure-response frame has the same effect on the master receiver unit as the skew-measure-request frame has on the slave receiver unit. Specifically, the master determines which frames were received within the skew value indicated by its skew register 594, outgates the late receivers and loads a new skew value in its skew register. When this has been accomplished, the master sends a replicated skew-measure-request frame across the link on all carriers.

In response to this skew-measure-request frame, the slave receiver unit determines whether all of the frames (received on receivers that have not been gated out) have arrived within the new skew value indicated by the skew register 594. If not, the slave receiver unit's microprocessor again checks the summary information in the FIFO 568 to determine which frame group(s) were late. The receivers detecting the late frames are gated out and are not used in subsequent skew tests. Also, the identity of the gated out receivers is also stored in the microprocessors local storage for later use. Next, a new value (e.g. 253) is loaded into the skew register and then the slave sends a replicated skew measure response control frame across the link on all carriers (including those whose receivers have been gated out).

The above described process continues iteratively (e.g. 614) until a relative skew value has been determined for each receiver on both sides of the link (i.e. until all but one receiver has been gated out or the skew register has been decremented to zero). When the slave has measured the relative skew for all receivers, it sets a bit in the skew measure response frame 616 indicating that the measurement is complete. When the master determines that skew measurements on both sides of the link are complete, it sends a skew-results-request (SRR) control frame 622 across the link. In response, the slave sends a skew results response control frame 624 (one on each carrier) back across the link. These frames include the measured skew values for the slave receivers (e.g. carrier 0=1, carrier 1=0, carrier 2=6, carrier 3=2). Each of the skew values is indicative of a number of word transmit times (e.g. 2=2 word transmit times). It should be understood that the skew measurements are all made relative to the fastest carrier(s). Thus the fastest carrier(s) (i.e. the first to arrive across the link) will always have a relative skew value of zero. The skew value returned in the skew results response may also include a padding value added to each measurement. This padding value can be used to compensate for random skew (jitter).

Once the skew-results-response frame has been received, the master can send an establish-transceiver-group (ETG) control frame 626. This request is used by the originating (master) node to elicit responses from the set of transceivers at the recipient (slave) node and also to set the intended link (the set of carriers that will be used to establish communications) at the slave. The request is sent as a replicated frame on all of the carriers that have passed the skew test (e.g. have a relative skew value of 254 or less). The parameter field of the ETG request contains the largest of the skew values determined by the master receivers. The master can also add a pad value in a similar manner as the slave (in sending the skew results response). This value determines the link-control-word to link-control-word spacing that is required for any frame groups that are to be sent by the slave.

In response to the ETG request, the slave sends an ETG response frame 628 (which is replicated on carriers on which the ETG request was received). The master node checks the ETG response to ensure that it has been received on each of the carriers on which the ETG request was sent. If the master node receives the ETG responses an all transceivers of the intended link, the link is established using the carriers designated by the ETG frames. If not, a link can be retried or established using a subset of the carriers comprising those which are operational. In that event, the master sends another skew results request to the slave and the slave again responds with the previously measured skew. Only the maximum skew on the intended link carriers is used to determine the minimum frame spacing.

Advantageously, the skew measurement method according to an embodiment of the present invention can determine the total skew including the systemic (SSKEW) and random (RSKEW) elements thus reducing or eliminating the need for pad values depending on the confidence level required. In such an embodiment, the operation of each carrier at a given skew value (in the skew register 594) is verified by repeating the skew test a multiplicity of times (e.g. 100) at that value. If a carrier can not pass the skew test even once (i.e. a replicated frame is not received within the tested skew window), it is considered to not be within the tested skew window as indicated by the skew register.

Figure 7:
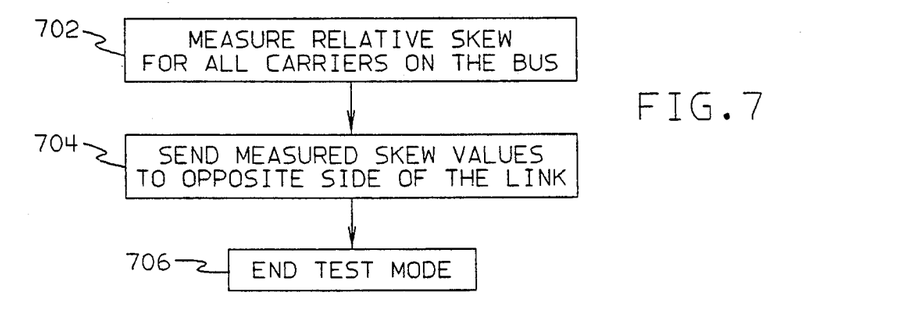
FIG. 7 is a flow chart summary of the skew test-/measurement procedure as view from a receiving end of the link.

A summary of the skew test/measurement procedure as viewed from a receiving end of the link is illustrated in FIG. 7. Once the receiver unit is in skew measurement mode, in step 702 it measures the relative skew for all carriers on the bus. Once the measurements have been accomplished on both sides of the link, in step 704 the measured worst case skew values are exchanged across the link. In the case of a slave node, the measured skew values for each carrier are sent across the link to the master. Finally, in step 706, once the exchange is complete, the receiver unit ends skew test/measurement mode and awaits a command from the system or link.

Figure 8:
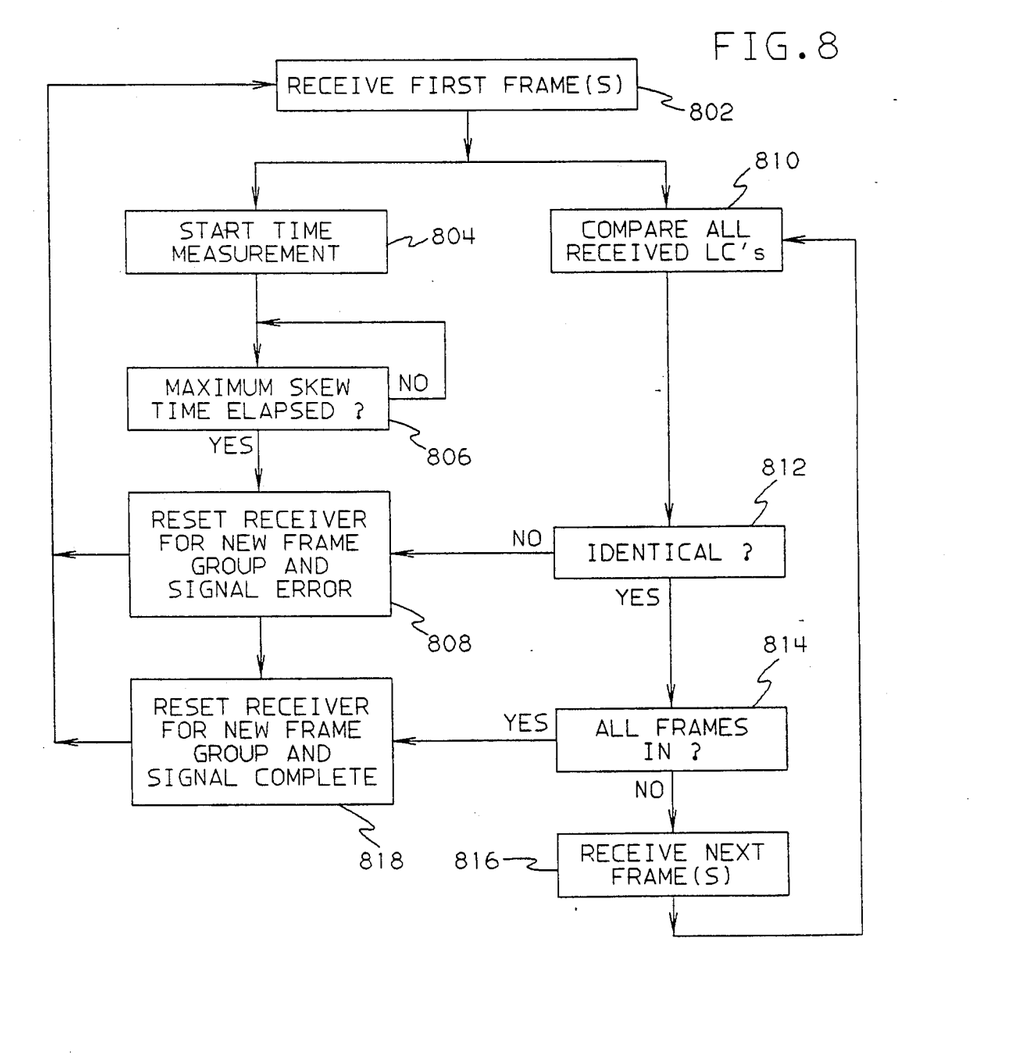
FIG. 8 is a flow chart of frame reception and frame group integrity checking in a receiver according to an embodiment of the present invention.

A summary of the method used by the receiver unit to receive and verify a frame group is illustrated in FIG. 8. In step 802 the receiver unit receives the first frame or frames in a frame group. In response, in step 804 the receiver unit starts its skew counter to measure elapsed word times and continuously compares the elapsed time against the maximum measured skew value for the established link. If at any time before all frames have been received (or an error has been detected), the elapsed time matches the worst case skew value (as detected in step 806), in step 808 the receiver unit is reset to receive a new frame group (which includes resetting the skew counter) and an error is reported.

In parallel, in step 810, as frames arrive their link control words are compared to ensure that they are all identical. If any newly arrived link control word does not match those for the other received frames (detected in step 812) in step 808 an error is signaled and the receiver unit is reset to receive a new frame group. The non-comparing frames are considered to be part of the new frame group and are treated by the receiver as such.

If the newly arrived frames compare, a test is made in step 814 to determine whether all the frames in the frame group have been received. This is a matter of comparing the active carriers, as indicated by the receiver unit's control register, with the received and properly comparing frames. If all frames have not yet been received, in step 816 the receiver continues to wait for additional frames to be received and continues the comparison and time measurement process as described above. If all frames have been received before the worst case measured skew time has elapsed, the receiving end of the link signals complete and the receiver is reset to receive the next frame group.

In summary, according to an embodiment of the present invention, the skew rules are as follows:

All transceivers must start transmission of the link-control word (LC) within 2.5 word transmission times across all of the drivers sending a frame group. A word transmission time is the amount of time it takes to launch (transmit on to the link) a word of information (32 data bits plus 8 bits of encoding information in the present embodiment).

Start-to-start spacing of link-control words of back-to-back frames on a single driver may be no closer than the value that is established during the skew test procedure. The start-to-start frame spacing is contained in the establish-transceiver-group request or the largest skew value returned in the skew results response frames.

If a link control word is received on a single receiver with less separation from the previous link control word than the start-to-start frame spacing as determined above, the frame is discarded as described by the function of OR gate 592.

Transceivers check to see that link-control words for each frame group are received within a predetermined time span from arrival of the first frame on the link. The length of the time span is specified by the maximum measured (worst case) skew value as determined by the skew test and can be optionally padded with a model dependant value that allows for long term jitter. The checking is performed only on the transceivers that are the members of the intended link as defined by the ETG request frame group sent or received and recognized.

If a frame group is received with a skew error, the frame group is rejected, or discarded as appropriate. Transceivers that fail a skew check are logged out for maintenance purposes.

Many variations and modifications which do not depart from the scope and spirit of the invention will now become apparent to those of skill in the art. Thus, it should be understood that the above described embodiments have been provided by way of example rather than as a limitation.

Having thus described our invention, what we claim as new and desire to secure by Letters Patent is:

1. A method for transmitting data frames across a communications link including a plurality of carriers, comprising the steps of:

launching, in parallel, a series of calibration frames over each of the carriers;

determining, for both sides of the communications link, a time difference between receipt of a first one of the calibration frames by a fastest one of the carriers and receipt of a second one of the calibration frames by slowest one of the carriers;

providing information indicative of the time difference, to transmitters on both sides of said communications link;

after said providing, limiting start-to-start spacing of sequential frames transmitted on any one of said carriers to no less than said time difference.

2. The method of claim 1 wherein said determining comprises the step of iteratively attempting to receive within a variety of time spans from receipt of a first one of said calibration frames, remaining ones of said calibration frames which were launched in parallel with said first one of said calibration frames; continuing to vary said time span until a maximum relative skew value has been determined; and wherein said providing comprises the step of providing said maximum relative skew value as said information indicative of the time difference.

3. The method of claim 2 wherein said variety of time spans begins at a first skew value and is iteratively decremented.

4. A communications system comprising:

an information transmission medium comprising a plurality of carriers;

a first node comprising a transmitter unit including a plurality of transmitters;

a second node comprising a receiver unit including plurality of receivers, each of the receivers being coupled to a corresponding one of said of the transmitters by way of a different one of the carriers;

the receiver unit comprising means for measuring a relative skew on each of the carriers and for providing a highest skew value to the first node;

the transmitter unit comprising means for transmitting a plurality of frames, in parallel, over the carriers and for ensuring that the start of back-to-back frames transmitted over the carriers are separated by no less than the highest skew value.

5. The system of claim 4 wherein said first node further comprises: means for ensuring that all of the frames in the plurality are transmitted within a predetermined time window.

6. The system of claim 4 wherein the receiver unit comprises: means for testing reception conditions of the plurality of frames against a set of skew rules and for informing the first node of an error condition if reception conditions do not fall within said set of skew rules.

7. The system of claim 4 wherein the receiver unit comprises means for determining when a first frame in the plurality of frames has been received and for determining whether remaining frames in the plurality of frames have been received within a time period from reception of the first frame, said time period being defined by the highest skew value.

8. The system of claim 4 further comprising means for determining when a first frame in the plurality of frames has been received and for determining whether remaining frames in the plurality of frames have been received within a time period from reception of the first frame, said time period being defined by the highest skew value plus a constant pad value.

9. The system of claim 4 wherein each of said frames comprises a link control word and wherein said receiver unit further comprises means for determining whether link controls words of said plurality of frames are identical with one another.

10. The system of claim 4 wherein the receiver unit comprises group determination means for determining whether received frames are all within the plurality of frames transmitted in parallel by the first node and wherein said plurality of frames does not include a sequence number identifying each of the frames as having been transmitted in parallel as part of a first group.

11. The system of claim 4 wherein the first and second nodes are each processors and wherein each processor comprises:
- a central processing unit;
- a main memory coupled to said central processing unit; and,
- a communications controller coupled to said main memory, said central processing unit and said information transmission medium.

12. The system of claim 4 wherein the carriers are optical fibers.

13. The system of claim 5 wherein said predetermined time window is no greater than 2.5 word transmission times.

14. The system of claim 7 wherein each of said frames comprises a link control word and wherein said receiver further comprises means for determining whether link controls words of said plurality of frames are identical with one another and for indicating an error condition to said first node if any of said link control words are not identical with one another or if all of said plurality of frames have not been received within said time period.

15. The system of claim 10 wherein said group determination means comprises means for temporarily storing frames that have been identified as not being transmitted within said first group and for storing said frames along with those of a second consecutive group.

16. A method for transmitting a group of data frames, one per carrier, across a communications link including a plurality of carriers, comprising the steps of:
- measuring, for at least one side of the communications link, a transmission time difference between a slowest one of the carriers and a fastest one of the carriers;
- providing information indicative of said transmission time difference, to a receiver on said at least one side of said communications link;
- detecting, at said receiver, when a first data frame has been received on said link;
- responsive to said detecting, commencing a measurement of time; and,
- after said commencing, determining whether all of the data frames in the group have been received within said transmission time difference and if not, generating a signal indicative of an error condition.

17. A method of communicating information across a plurality of carriers, comprising the steps of:
- launching, within a predetermined time window from a transmitting node, a first plurality of frames, one on each of the carriers;
- receiving a second plurality of frames on the carriers by a receiving node;
- testing reception of the second plurality of frames against a set of skew rules;
- responsive to the testing, determining which of the frames in the second plurality were launched as part of the first plurality of frames.

18. The method of claim 17 wherein said predetermined time window is 2.5 word transmission times.

19. The method of claim 17 wherein each of the frames in the first plurality include an identical link control word and wherein the skew rules include determining which of the frames in the first plurality were received within a time window previously measured with respect to frames communicated across a link between said transmitting node and said receiving node.

20. The method of claim 19 wherein said determining comprises the further step of comparing link control words of the second plurality of frames, identifying frames having identical link control words as having been launched as part of the first plurality of frames, and storing the second plurality of frames as a group, responsive to a determination that the link control words are identical.

21. The system of claim 17 wherein said determining comprises the further step of temporarily storing a frame that has not been identified as having been launched as part of said first plurality of frames and for storing said frame along with those of subsequently received plurality of frames.

22. A transceiver for use in parallel communications system, said transceiver comprising:
- a receiver unit comprising a plurality of receivers, each of the receivers being coupled to an individual information carrier of a multiple carrier bus;
- the receiver unit further comprising means for measuring a relative skew of units of information received on each carrier and means for determining, based at least in part on the measuring, which of the units of information were launched on the bus as part of a common information group.

23. The transceiver of claim 22 wherein said means for determining comprises means for temporarily storing at least one of the units of information that has been identified as not having been launched as part of the common information group and for storing the at least one unit of information along with a plurality of subsequently received units of information.

* * * * *